United States Patent [19]

Noda

[11] 4,418,262
[45] Nov. 29, 1983

[54] PROGRAMMABLE MICROWAVE OVEN WITH PROGRAM DISPLAY

[75] Inventor: Tominitsu Noda, Fuji, Japan

[73] Assignee: Tokyo Shibaura Denki Kabushiki Kaisha, Kawasaki, Japan

[21] Appl. No.: 377,478

[22] Filed: May 12, 1982

Related U.S. Application Data

[63] Continuation of Ser. No. 186,622, Sep. 12, 1980, abandoned.

[30] Foreign Application Priority Data

Sep. 14, 1979 [JP] Japan .................................. 54-118061
Sep. 14, 1979 [JP] Japan .................................. 54-118073

[51] Int. Cl.³ .............................................. H05B 6/68
[52] U.S. Cl. .............................. 219/10.55 B; 219/506; 340/713; 340/365 R
[58] Field of Search ................... 219/10.55 B, 506; 340/802, 712, 713, 792, 365 R; 364/715; 235/92 ST, 92 EA, 92 EC

[56] References Cited

U.S. PATENT DOCUMENTS 3,786,429 1/1974 Goldman et al. ............... 340/802 X
3,911,424 10/1975 Giannuzzi et al. ............. 340/365 R
3,925,777 12/1975 Clark ............................... 340/802 X
4,011,428 3/1977 Fosnough et al. ........... 219/10.55 B
4,156,285 5/1979 Olander, Jr. ....................... 364/715

FOREIGN PATENT DOCUMENTS 1197996 8/1965 Fed. Rep. of Germany .
2900943 1/1980 Fed. Rep. of Germany .
53-89050 8/1978 Japan ......................... 219/10.55 B
53-103244 9/1978 Japan ......................... 219/10.55 B
53-115945 10/1978 Japan ......................... 219/10.55 B

OTHER PUBLICATIONS

Bell and Ogden, "Single Chip Microprocessor Rules the Roast", Electronics, pp. 105–110, Dec. 9, 1976.

*Primary Examiner*—B. A. Reynolds
*Assistant Examiner*—Philip H. Leung
*Attorney, Agent, or Firm*—Cushman, Darby and Cushman

[57] ABSTRACT

A microwave oven according to the invention have one-chip microprocessors including a ROM, a RAM and an I/O port. In the ROM a permanent program for controlling the RAM, a data input unit and a display unit is stored. Data is coupled from the data input unit and stored in the RAM according to the permanent program. The display unit is controlled according to the permanent program such that the data stored in the RAM are displayed on the display unit at a constant interval for permitting the checking of the heating program.

3 Claims, 28 Drawing Figures

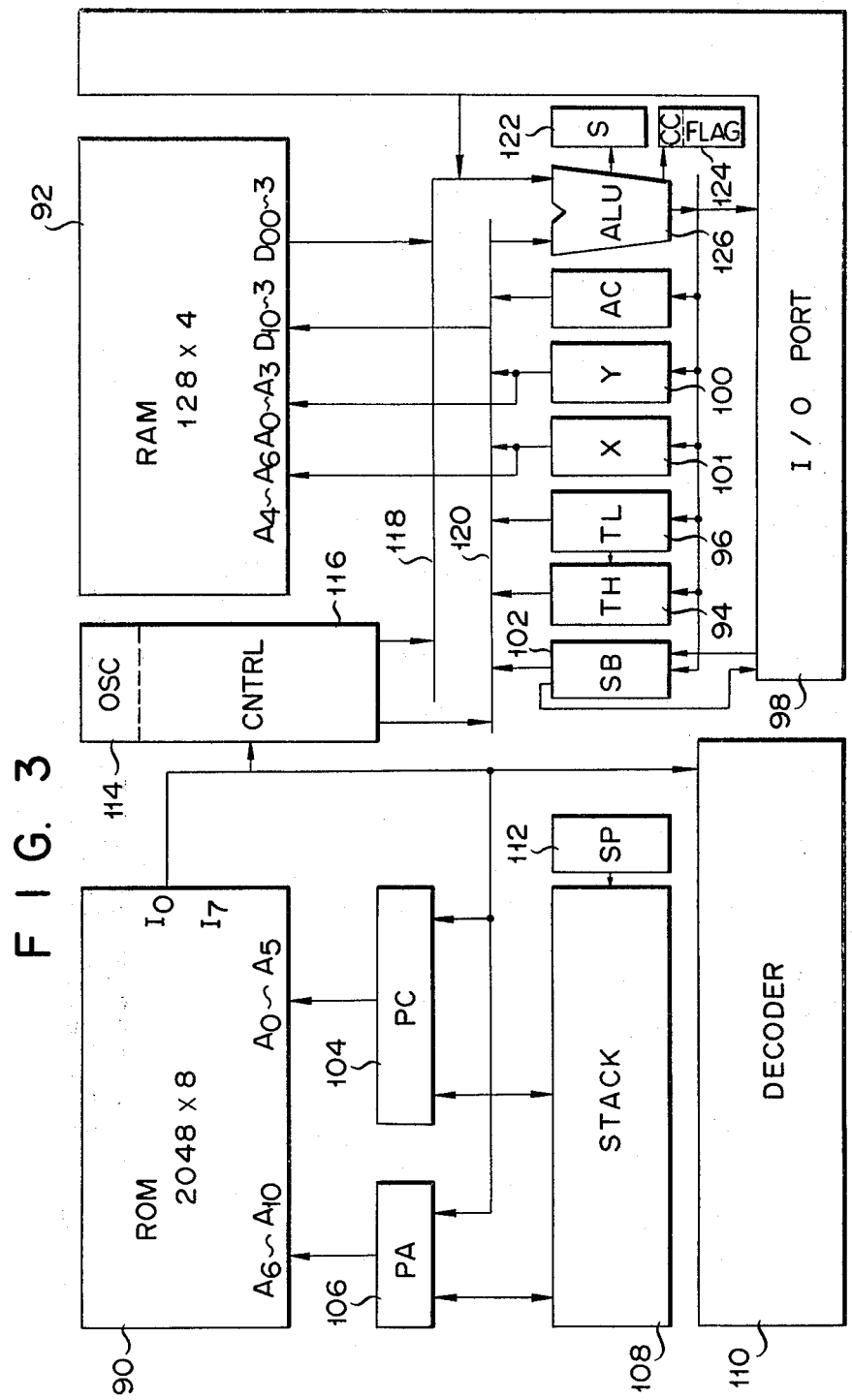

FIG. 4
| ROW \ COLUMN | 0 | 1 | 2 | 3 | 4 | 5 | 6 | 7 |
|---|---|---|---|---|---|---|---|---|
| 0 | TIME | OR | 1 STAGE TEMP. | DATA | | OUT | 1 STAGE PUT | DATA |
| 1 | TIME | OR | 2 STAGE TEMP. | DATA | | OUT | 2 STAGE PUT | DATA |
| 2 | TIME | OR | 3 STAGE TEMP. | DATA | | OUT | 3 STAGE PUT | DATA |
FIG. 5
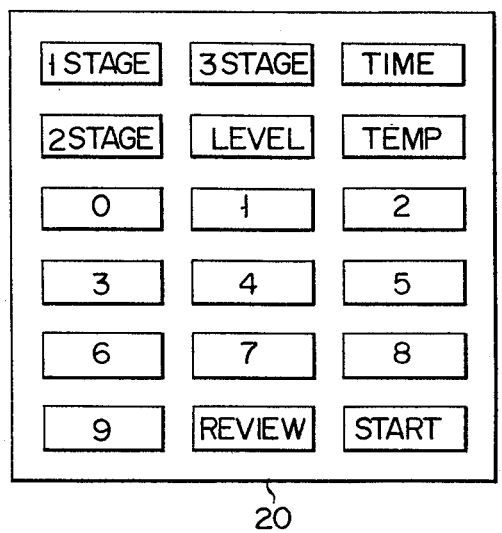
FIG. 6
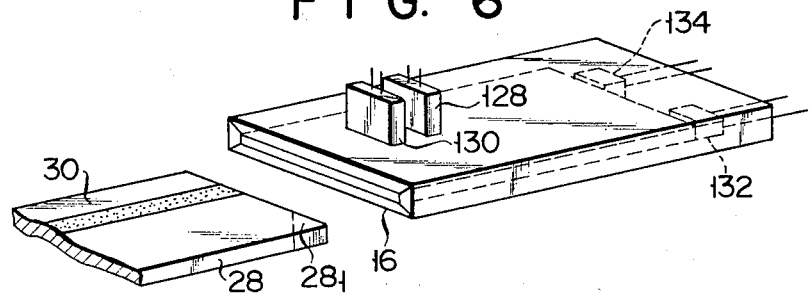

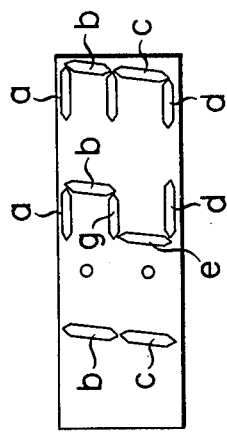
FIG. 8
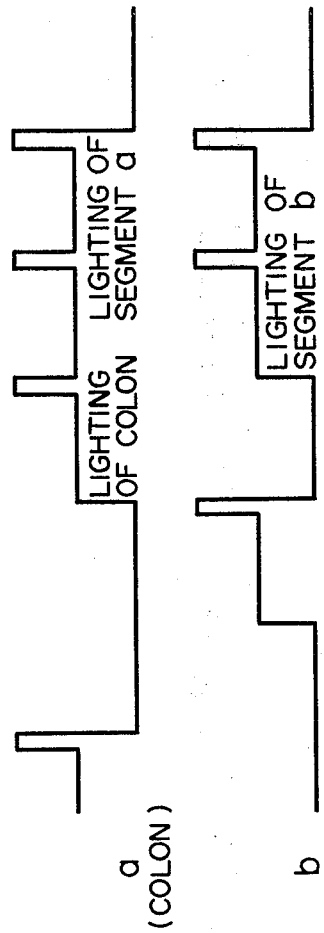
FIG. 9A a (COLON)
FIG. 9B b

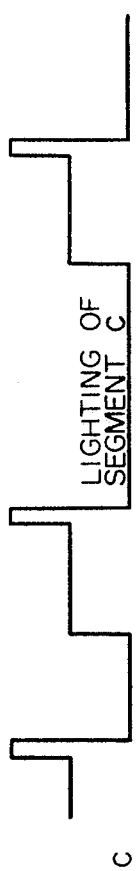
FIG. 9C
FIG. 9D
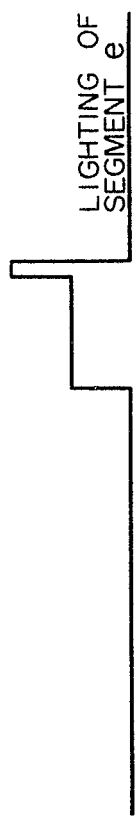
FIG. 9E
FIG. 9F
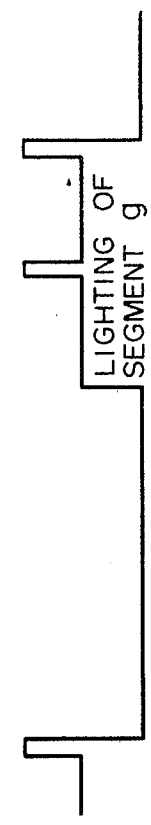
FIG. 9G

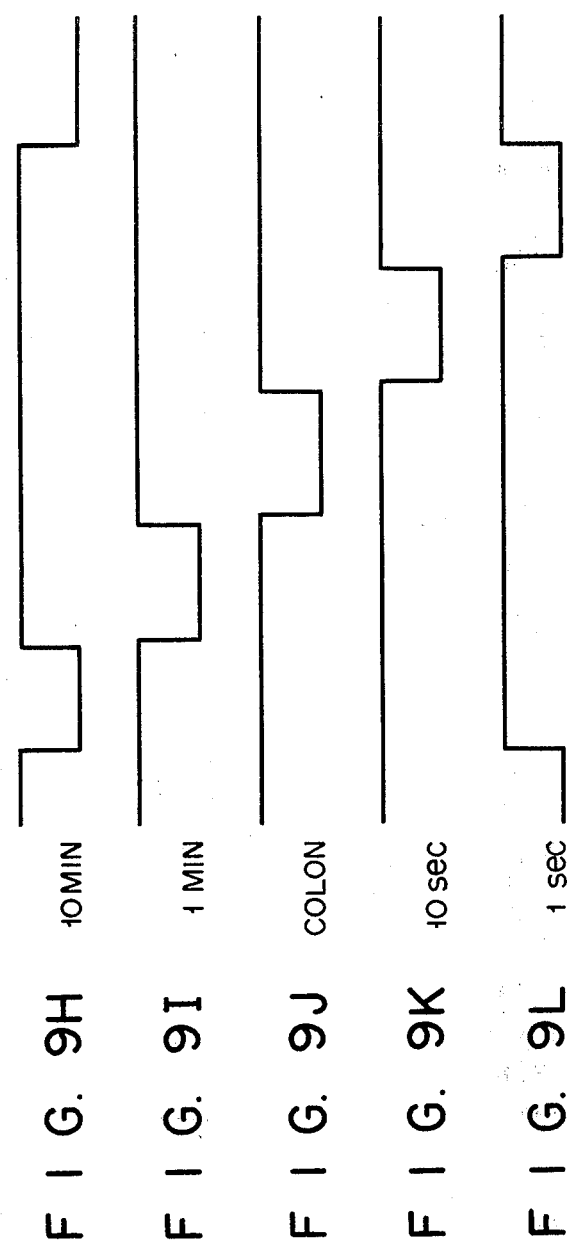

PROGRAMMABLE MICROWAVE OVEN WITH PROGRAM DISPLAY

This is a continuation of application Ser. No. 186,622 filed Sept. 12, 1980, now abandoned.

This invention relates to microwave ovens for automatically heating the foodstuff in accordance with a heating program memorized in advance and, more particularly, to a microwave oven, in which the contents of a heating program coupled through keyswitch operations or from a recording medium such as a magnetic card can be read out automatically or by operating an exclusive key.

With recent progress of microcomputer techniques various microwave ovens, which use microcomputers for controlling the heating period, heating temperature, heating power output level and so forth, have been developed. The heating or cooking program as such control information as mentioned above is usually read out from a keyswitch board or a recording medium such as a punched card, an embossed card or a magnetic card into the microcomputer. For example, the construction and operation of a microwave oven having stage keys, a time key and a level key are disclosed in U.S. application Ser. No. 887,221 entitled "Microwave Oven", now abandoned. Also, the construction and operation of a microwave oven having the aforementioned recording medium are disclosed in U.S. application Ser. No. 50,786 now U.S. Pat. No. 4,317,976 filed by the same applicant and entitled "High Frequency Heating Apparatus".

In case of a heating program involving a number of switchings of the heating power level (for instance a heating program specifying a heating process with the power output level of 100% for 10 minutes in a first stage, 50% for 5 minutes in a second stage and 70% for 8 minutes in a third stage), it is sometimes desired to check that there is no error in the preset program before putting the heating process into force.

At such time, with the prior-art microwave ovens it has been in practice to let the preset program contents for the first stage to be successively read out and displayed on a display section by operating the first stage key, time key and level key independently of one another, then let the contents of the second stage to be similarly read out and displayed by operating the relevant keys and so forth.

The necessity of operating a plurality of keys for each stage of the heating program for the confirmation of the contents thereof, however, is very cumbersome.

Further prior-art microwave ovens include one disclosed in U.S. Pat. No. 4,011,428, Mar. 8, 1977. This microwave oven is capable of programming heating conditions and also has a display section. However, it has no function of continuously displaying all the contents of the heating program.

The primary object of the invention is to provide a microwave oven which overcomes the aforementioned drawbacks in the prior art.

Another object of the invention is to provide a microwave oven, with which the operation of checking a heating program is simplified so that all the program contents are automatically read out and displayed by operating a predetermined switch only once.

A further object of the invention is to provide a microwave oven, which obviates the prior-art drawbacks and permits the operation of checking a heating program to be simplified in that the contents of the heating program are automatically read out from a program card reader and displayed after the end of reading of the program from the card.

To achieve the above object of the invention, there is provided a microwave oven, in which the heating power output level is automatically controlled for a predetermined period of each of a plurality of predetermined heating stages, including:

a data input means for producing a coded electric signal for automatically controlling the microwave oven heating power output level;

a means for exciting a heating element;

a time pulse generating means;

a display means for displaying desired parameters including desired data coupled from said data input means;

a control means constituted by a microprocessor connected to said data input means, said exciting means, said time pulse generating means and to said display means, said microprocessor having a central logic unit for receiving an input signal for controlling said exciting means and said display means and also receiving a signal from said time pulse generating means to effect time measurement, a read only memory means storing a fixed program and a random access memory means for memorizing data loaded from said data input means, said read only memory means having a permanent program for controlling the function of said central logic unit, said control means being permitted to execute a particular function according to said permanent program; and said data input means, said random access memory means and said display means being controlled according to said permanent program such that after the completion of the coupling of data from said data input means and storage of said coupled data in said random access memory means all the data stored in said random access memory means are successively read out and displayed at a constant time interval.

Other objects and features of the present invention will be apparent from the following description taken in connection with the accompanying drawings.

FIG. 3 is a block diagram of a microcomputer shown in FIG. 2;

FIG. 4 is a memory map of the RAM shown in FIG. 3;

FIG. 5 shows the keyswitch arrangement of the keyswitch board shown in FIG. 2D;

FIG. 6 illustrates the relation in disposition of the magnetic head, card detection switch and re-recording prevention switch shown in FIG. 2 to the card inlet;

FIG. 8 is a view showing an example of the display of time information;

Figure 10A:
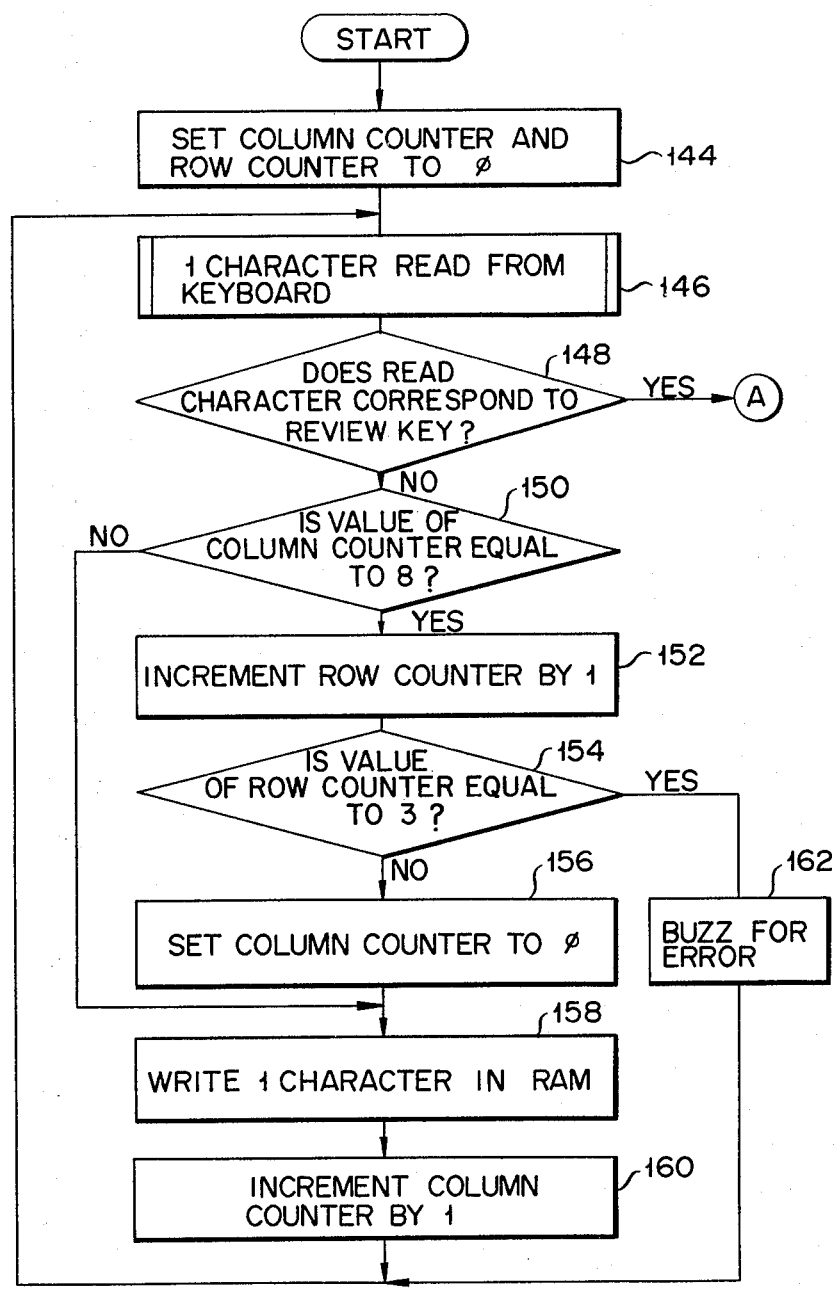
Figure 10B:
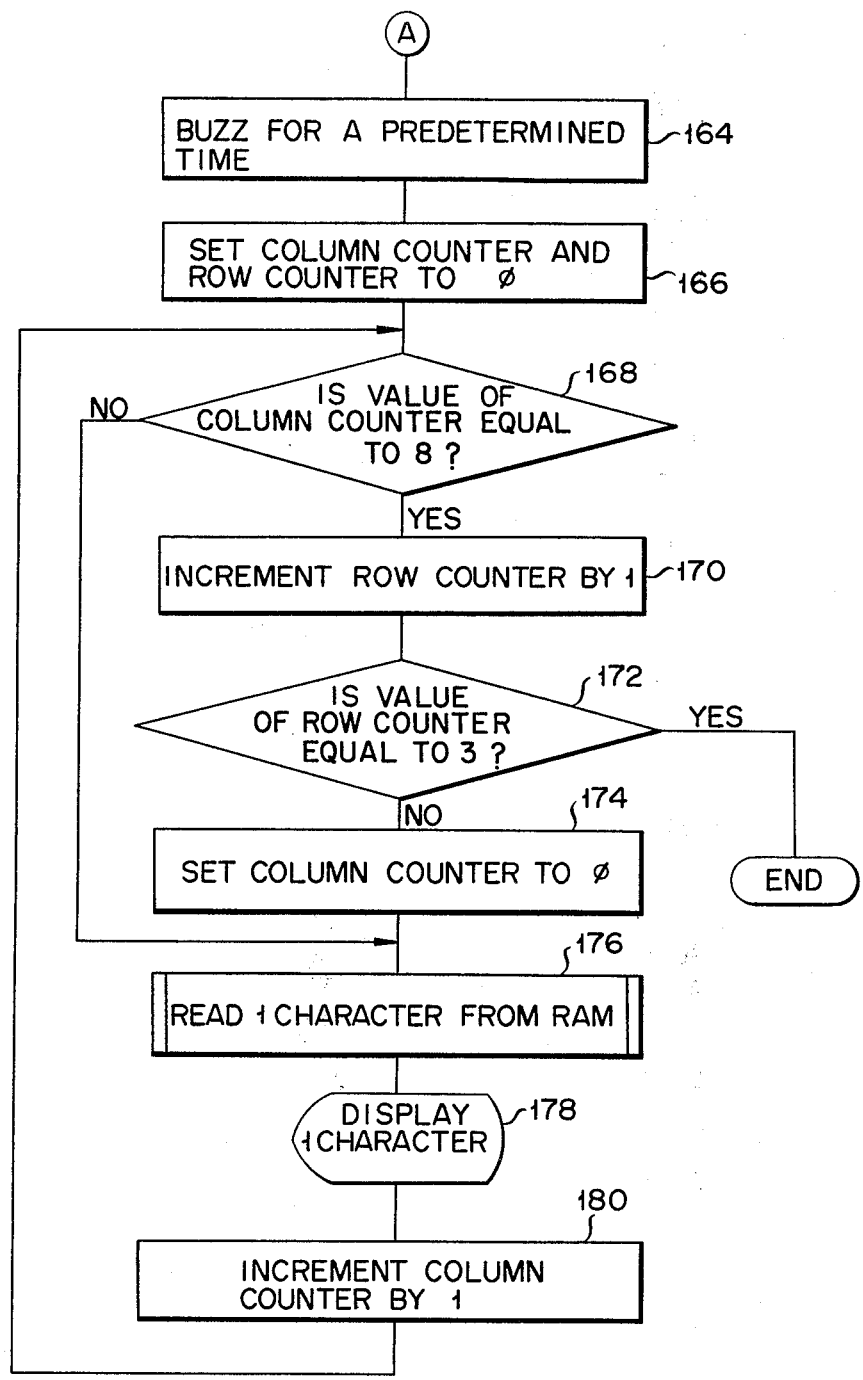
Figure 10C:
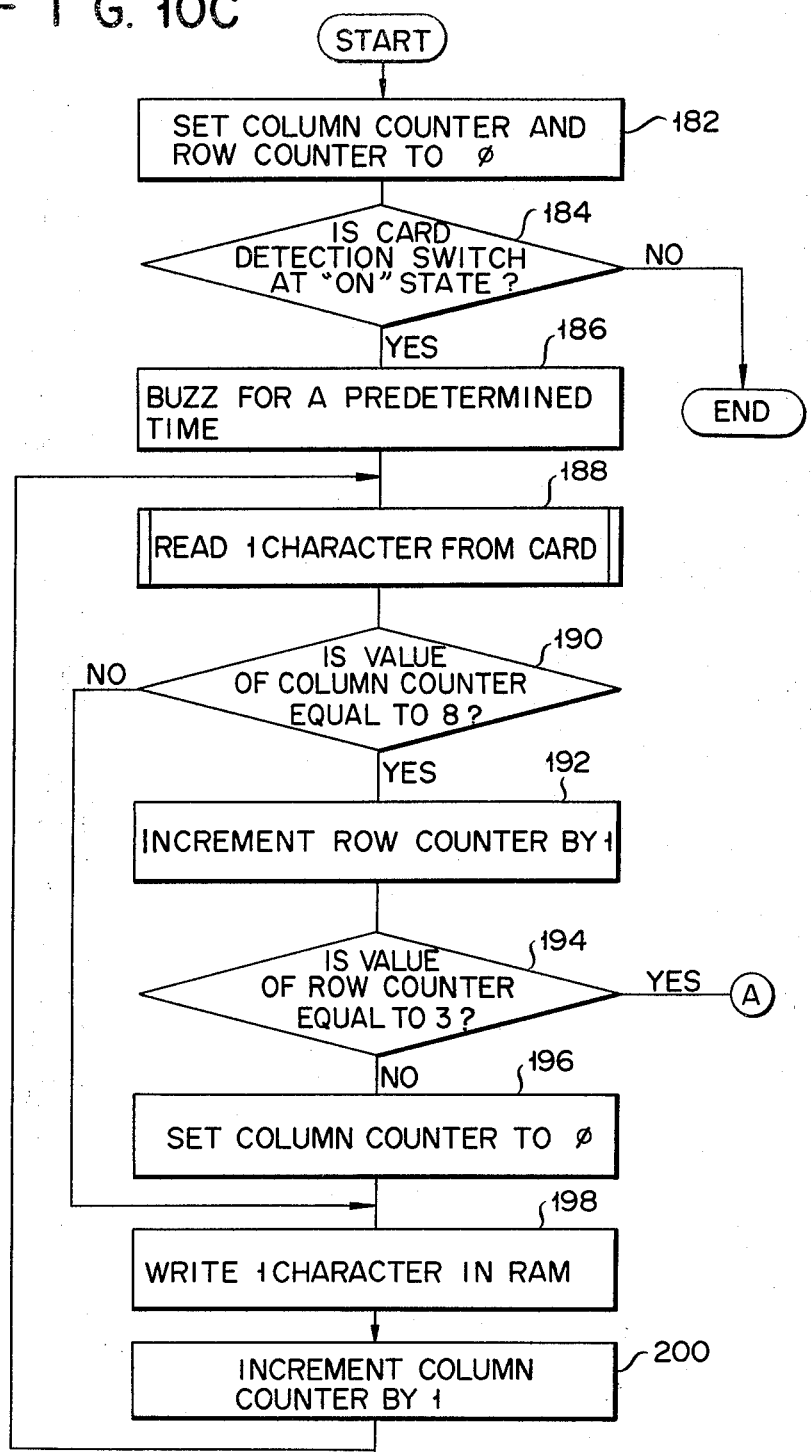
Figure 11:
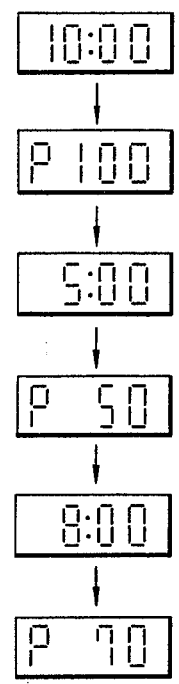

FIGS. 9A through 9L form timing charts for segment signals and digit signals, with FIGS. 9A through 9G forming a timing chart for the segment signals and FIGS. 9H to 9L forming a timing chart of the digit signals;

FIGS. 10A through 10C show operation flow charts of steps involved when coupling a heating program, memorizing it in a random access memory (RAM) and continuously displaying the memorized contents, with FIG. 10A illustrating the case of coupling a heating program from a keyswitch board, FIG. 10B illustrating the case of continuously displaying the contents memorized in the RAM and FIG. 10C illustrating the case of coupling a heating program from a card reader; and FIG. 11 shows an example of the continuous display.

Figure 1:
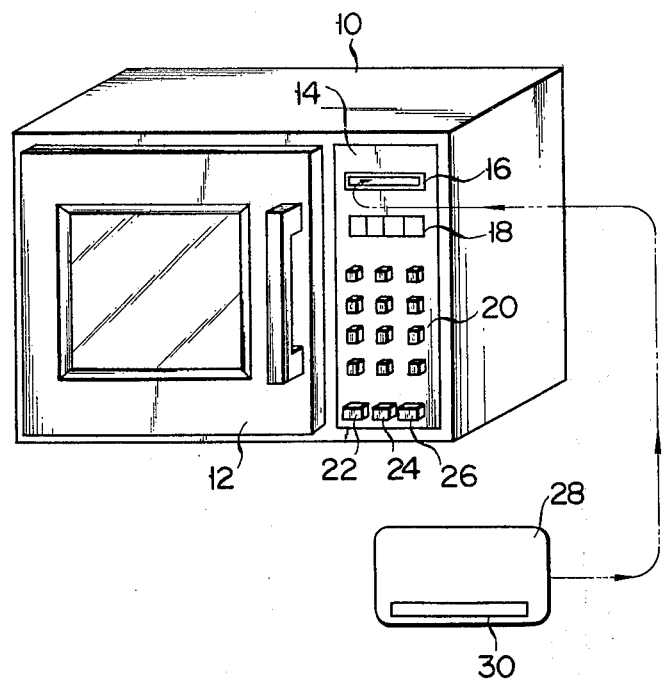
FIG. 1 is a perspective view showing an embodiment of the microwave oven according to the invention.
Figure 2:
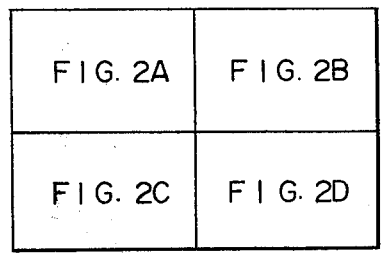
FIG. 2 shows an arrangement of FIGS. 2A through 2D.
Figure 2A:
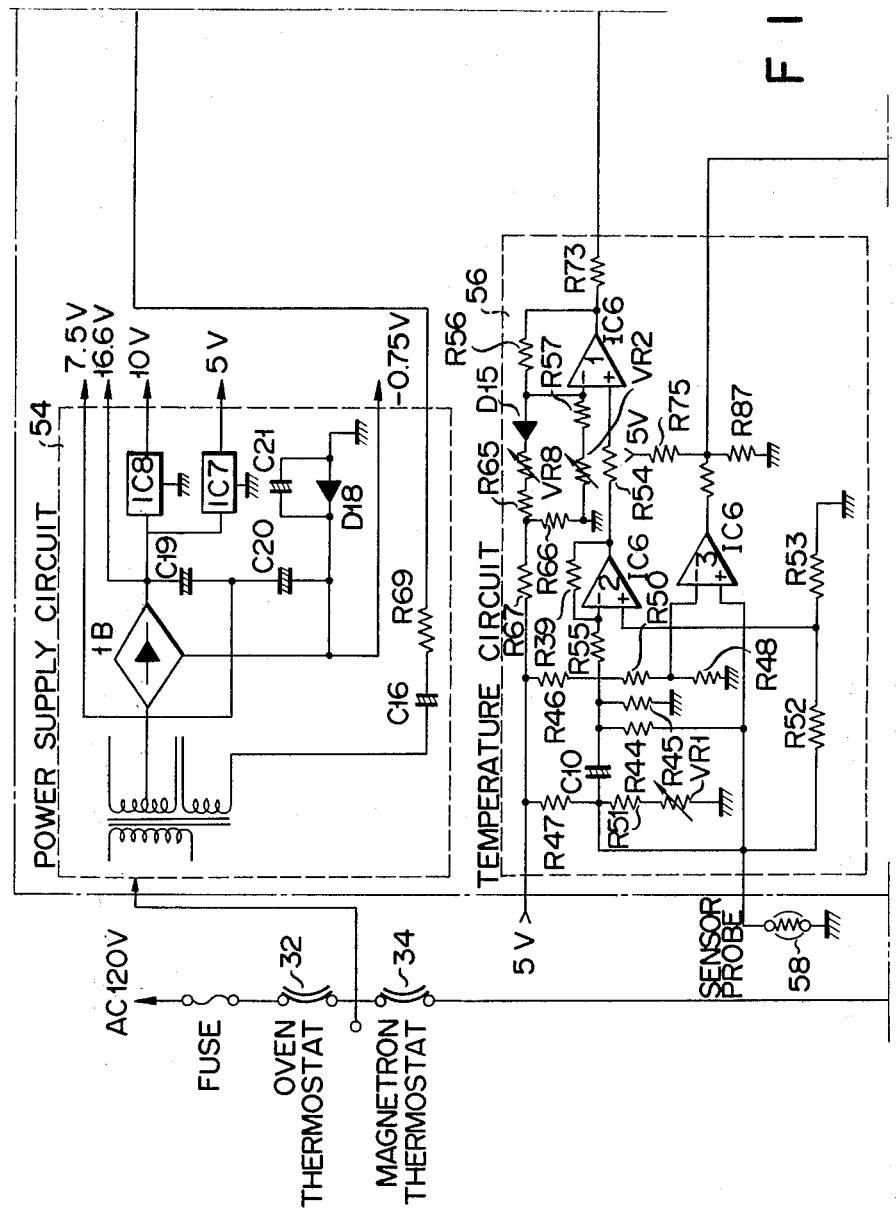
FIGS. 2A through 2D show the entire circuit of the microwave oven shown in FIG. 1.
Figure 2B:
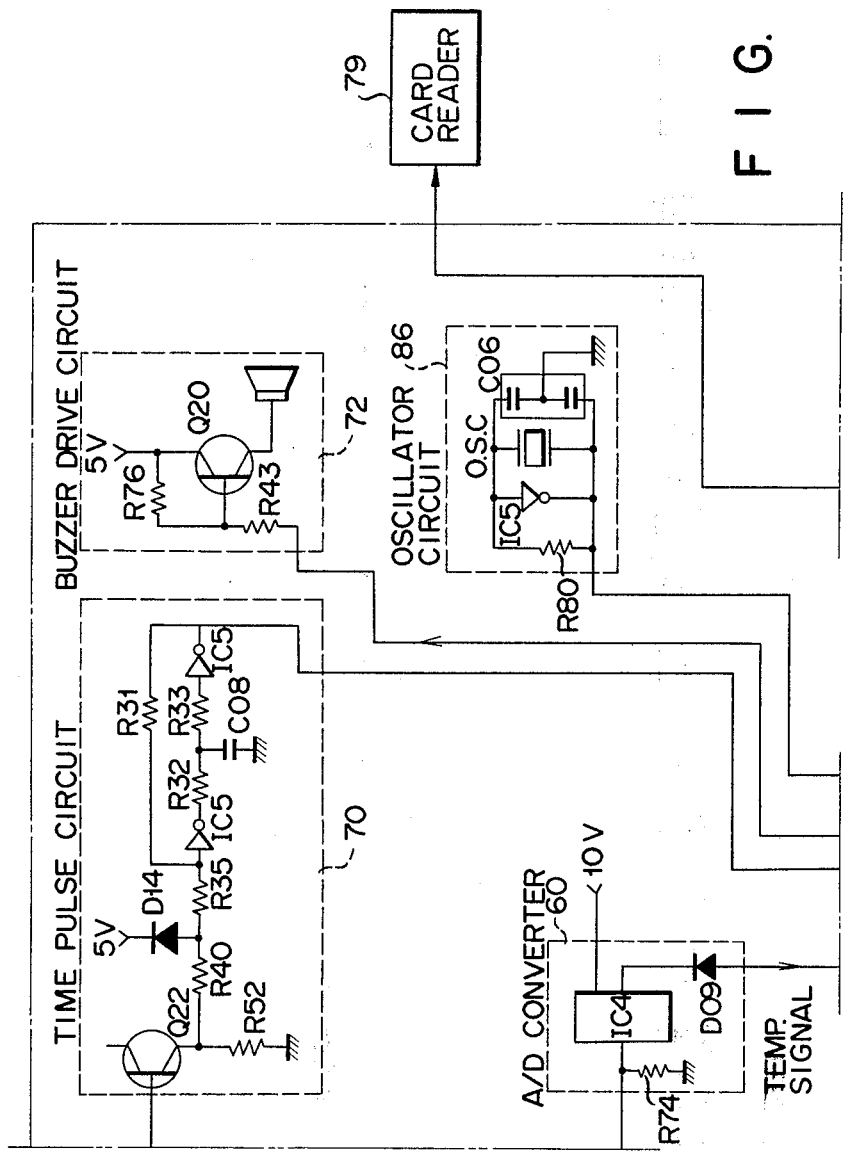
Figure 2C:
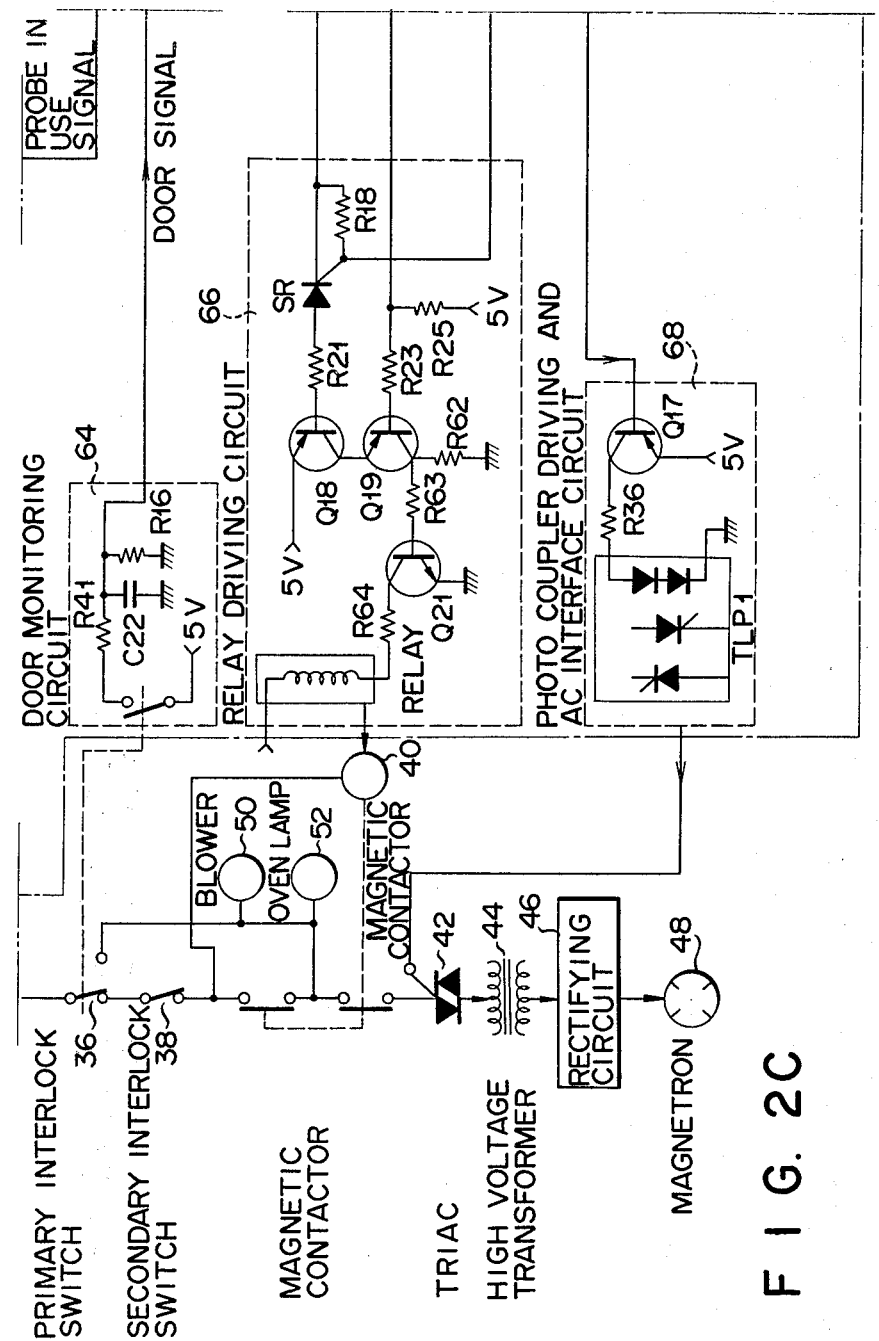
Figure 2D:
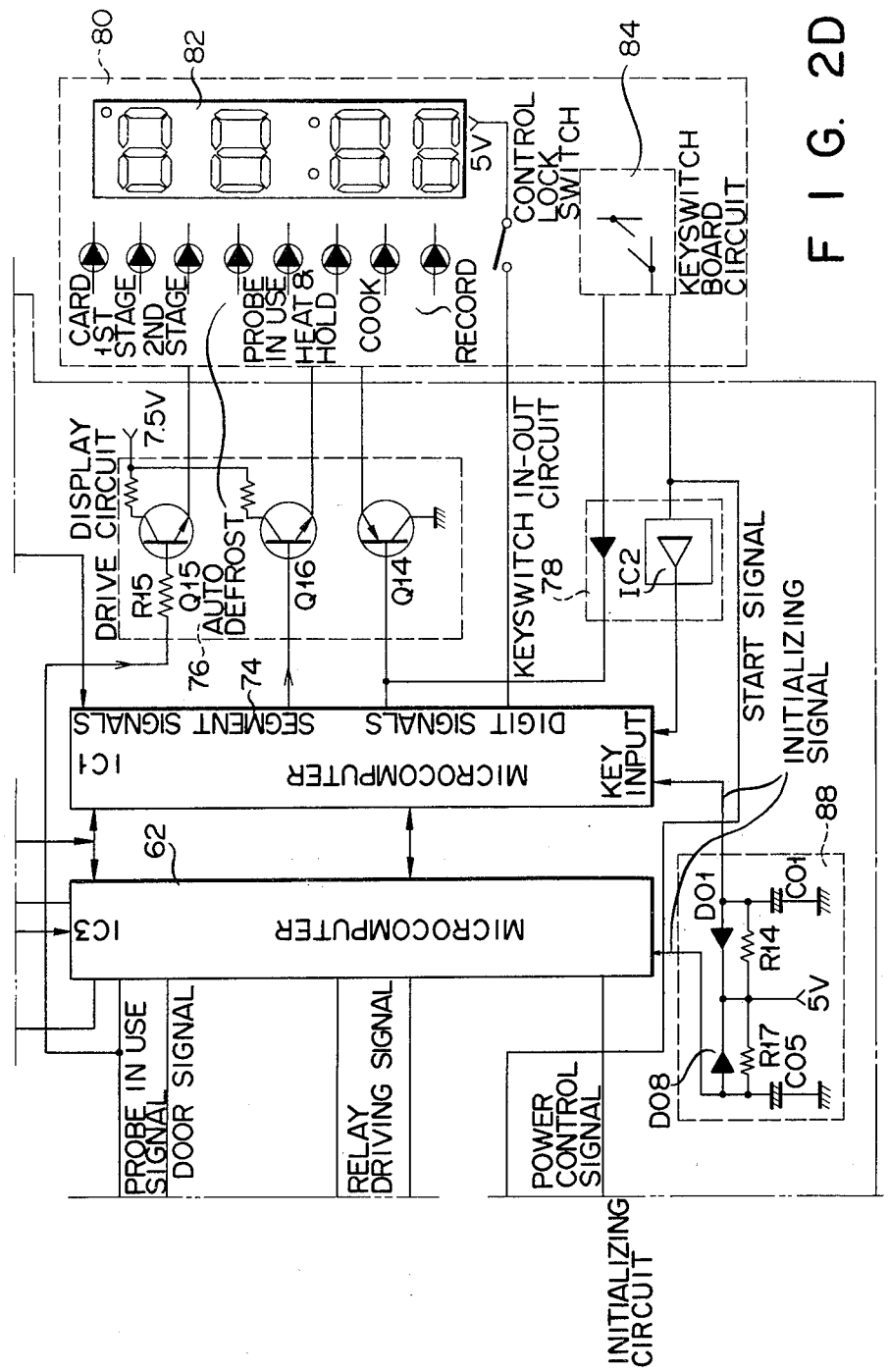

FIG. 1 is a perspective view showing an embodiment of the microwave oven according to the invention.

Designated at 10 is the frame of the microwave oven. It has a door 12 pivoted to it and an operation panel 14. The operation panel 14 includes a card inlet 16, a digital display section 18, a keyswitch board 20 for coupling a heating or cooking program, a start switch 22, a review switch 24 and a power switch 26. A program card 28 can be inserted from the card inlet 16. On this card 28, the name of cooked foodstuff, the quantity of cooked foodstuff and a heating or cooking program specifying heating period and heating power level are indicated. Also, the card 28 has a magnetic tape 30 provided at a predetermined position. On the magnetic tape 30, the contents of the heating program (such as stage number, heating period or heating temperature and heating power output level) is recorded in a coded form. When the card 28 is inserted from the card inlet 16, the heating program data recorded on its magnetic tape 30 is read out, and the heating is automatically carried out on the basis of the heating program data. Of course, a heating program may be loaded by operating keys on the keyswitch board 20.

FIGS. 2A through 2D show the entire circuit of the microwave oven according to the invention. An oven thermostat 32, a magnetron thermostat 34, a primary interlock switch 36, a secondary interlock switch 38, a magnetic contactor 40, a triac 42, a high voltage transformer 44, a rectifying circuit 46 and a magnetron 48 are connected in series across an AC 120 V power source. Further, a blower 50 and an oven lamp 52 are connected through the primary interlock switch 36 and magnetic contactor 40 to the aforementioned AC power source.

A power supply circuit is connected to the AC circuit and supplies DC power to various circuits to be described later. A temperature circuit 56 has a sensor probe 58, which is inserted into the foodstuff. The detected temperature is converted into an analog signal, which is coupled to an analog-to-digital (A/D) converter 60 connected to the temperature circuit 56. The A/D converter 60 converts this input signal into a digital signal which is coupled to a first microcomputer 62.

The temperature circuit 56 supplies a signal indicating that the sensor probe 58 is being used to the first microcomputer 62.

A door monitoring circuit 64 is connected to the primary interlock switch 36 and first microcomputer 62 and supplies information as to whether the door is open or closed to the first microcomputer 62. A relay driving circuit 66 is connected to the magnetic contactor 40 and first microcomputer 62 and drives the magnetic contactor 40 according to a relay driving signal produced from the first microcomputer 62. A photo-coupler driving and AC interface circuit 68 is connected to the triac 42 and first microcomputer 62 and controls the output of the magnetron 48.

A time pulse circuit 70 supplies a time pulse constituting the reference time for the display of time information to the first microcomputer 62.

The first microcomputer 62 is connected to a buzzer drive circuit 72. This buzzer drive circuit 72 drives a buzzer at the time of, for instance, reading a heating program from a keyswitch board 84 or a card reader 79.

A second microcomputer 72 is connected to a display drive circuit 76, a keyswitch in-out circuit 78 and to the card reader 79. The display drive circuit 76 is connected to a keyboard assembly 80 and permits display information (such as the heating program and time information) to be displayed on a display section 82 in the keyboard assembly 80. The keyboard assembly 80 has the aforementioned keyswitch board circuit 82, and the heating program keyed therein is coupled through the keyswitch in-out circuit 78 to the second microcomputer 74. Also, it is possible to couple the heating program information to the second microcomputer 74 by causing the magnetic card 30 shown in FIG. 1 to be read by the card reader 79. An oscillator circuit 86 supplies a reference clock signal to the first and second microcomputers 62 and 74.

An initializing circuit 88 supplies an initialize signal to the first and second microcomputers 62 and 74. In this embodiment, the first microcomputer 62 is for example a 4-bit microcomputer MB8841 provided by the Fugitsu Corporation in Japan, and the second microcomputer is for example a 4-bit microcomputer MB8842 also provided by the Fujitsu Corporation in Japan. It is also possible to use pps-4/1 MM77 Single Circuit Microcomputer of Rockwell International Corporation in U.S.A. as these microcomputers. Further, while in the design of this embodiment the two microcomputers 62 and 74 are used, it is of course possible to use a large-capacity microcomputer, for instance a 12-bit type one-chip microcomputer.

These microcomputers 62 and 74 have a read only memory (ROM), a random access memory (RAM) and an input/output (I/O) port. The internal construction of these microcomputers 62 and 74 will now be described with reference to FIG. 3.

FIG. 3 shows a schematic block diagram of the microcomputers 62 and 74. In the Figure, designated at 90 is the ROM. In this embodiment the capacity of ROM 90 is 2,040 (w)×8 (b). In the ROM 90 a heating program for controlling the heating by controlling the relay driving circuit 66, photo-coupler driving and AC interface circuit 68, etc. in accordance with the order of specifications of the cooking program data is stored. Also, in the ROM a control program for heating-program data input and for checking control, i.e., for controlling the reading of a heating program from the magnetic card 28 or keyswitch board 20, transfer of the read-out data to the RAM 92 and automatic reading and display of the heating program data from the RAM 92, is stored. The RAM 92 has a capacity of, for instance, 128 (w)×4 (b). In the RAM 92 data coupled from a data input unit to be described later is stored.

FIG. 4 shows the memory map of the RAM 92. As is shown the RAM 92 has three stages, with the data for each stage constituted by a total of eight characters, more particularly four characters as the time or temperature data and the other four characters as the power output level data. The writing and reading of these data with respect to the RAM 92 are controlled by a column counter (i.e., an X register 101 shown in FIG. 3) and a row counter (i.e., a Y register 100 shown in FIG. 3). A time counter (TH) 94 and another time counter (TL) 96 include a 8-bit non-synchronous counter capable of programming as a real timer. The eight bits are constituted by upper four bits (TH) and lower four bits (TL). A timer is driven by an internal or external clock, and in the case of the external clock it operates as an event counter. With the overflow of the timer/counter an interruption is produced, and if a state capable of receiving the interruption prevails jumping of the program to a fixed address is caused after the return address is automatically stored in a stack 108. The I/O port 98 is provided for control and also for data. The specification here is made directly by an instruction code or indirectly through the Y register 100. A serial buffer (SB) 102 effects buffering of data to be coupled to and from a serial input/output port. The data in the serial buffer is serially transferred in synchronism to a shift clock signal coupled from the internal or external clock.

In an output mode, data of the serial buffer 102 is serially outputted and latched. In an input mode, data from a serial input port is taken out in synchronism to the shift clock signal. When a 4-bit data transfer from the internal or external clock is completed, an interruption is produced. At this time, if a state capable of receiving the interruption prevails, jumping of the program to a fixed address is caused after the return address is automatically stored in the stack. A program counter (PC) 104 is a 6-bit binary counter and indicates an address in a page of the instruction to be executed next. A page register (PA) 106 is a 5-bit register, and it is used for specifying a page address in the program memory. The stack 108 is a register for automatically saving the return address by a subroutine call. At the time of occurrence of an interruption, the status (S) and condition flag (CC) of the instruction that is being executed at this time are saved in addition to the return address. An instruction decoder 110 denotes 8-bit microcommands produced from the ROM 90 and produces various pieces of information. A stack pointer (SP) 112 is provided for specifying the location in the stack 108. An oscillator (OSC) 114 produces a reference clock signal required for the operation of this microprocessor. A control circuit 116 controls internal buses 118 and 120. A status register 122 and a condition code/flag register 124 are provided for storing instruction status and calculation condition and calculation result flags. An arithmetic logic unit (ALU) 126 performs various logic operations and arithmetic operations such as taking out data from a data input unit (to be described later), storing the taken-out data in the RAM 92, outputting the data stored in the RAM 92 to the display unit and measuring time by taking out an output signal from the time pulse circuit 70 in accordance with control information obtained from the instruction decoder 110.

The keyswitch board circuit 84 has a construction as shown in FIG. 5, having ten keys for "0" to "9", stage keys for specifying the respective first, second and third stages of a heating program, a level key for specifying the heating output level, a temperature key for specifying the heating temperature, a time key for specifying the heating period of time, a start key for specifying the start of the heating and a review key for specifying automatic program read-out and display.

FIG. 6 shows the magnetic card 30 and the neighborhood of the card inlet 16 shown in FIG. 1.

Figure 7:
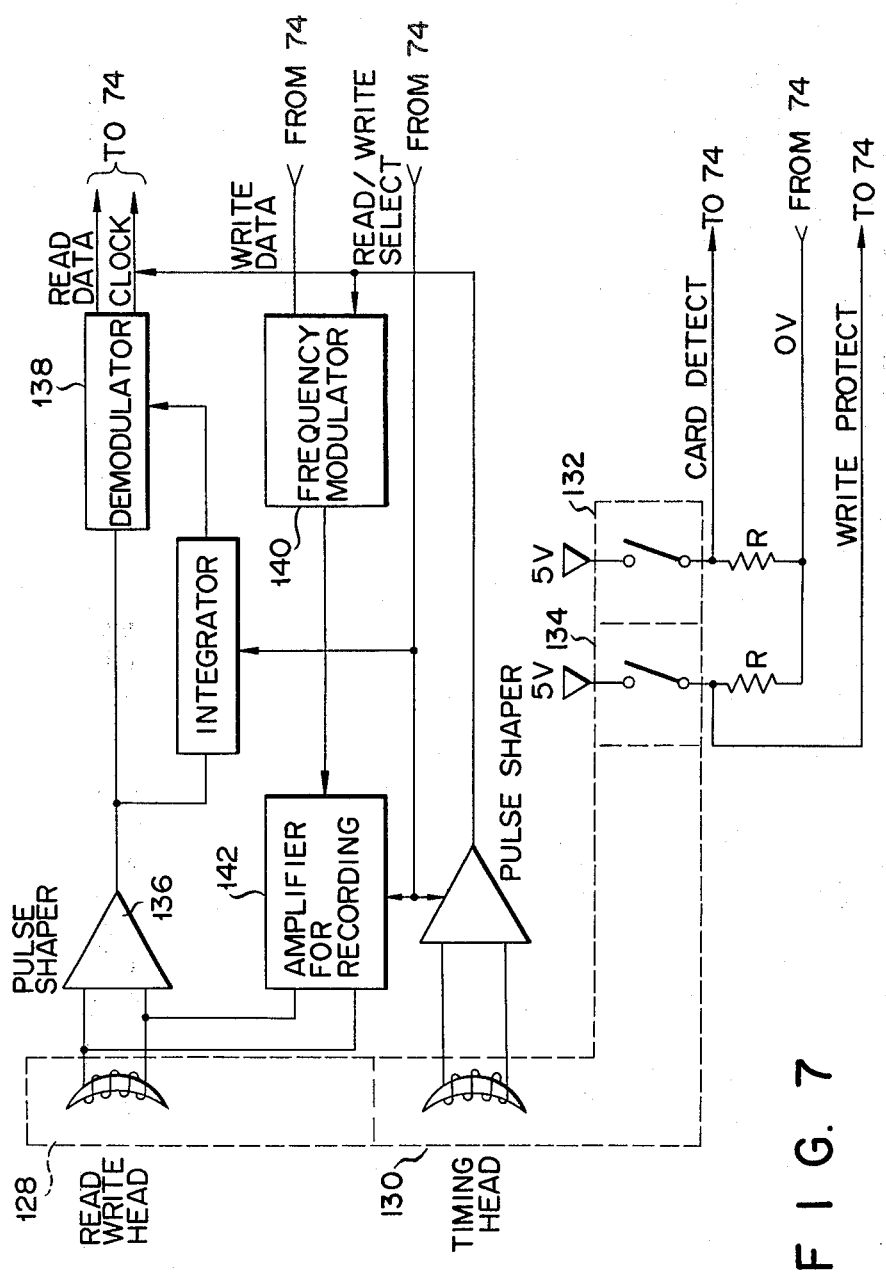
FIG. 7 is a block diagram of the magnetic card reader shown in FIG. 2.

This card reader 79 is provided with a read/write head 128 for reading data out of and writing data in the magnetic card 28, a timing signal head 130 for writing and reading timing signal with respect to the card 28, a magnetic card detection switch 132 and a re-recording inhibition switch 134. The magnetic heads 128 and 130 are disposed side by side such that they can face the magnetic tape section 30 of the card 28. Thus, they can read out the timing signal and recorded data when the magnetic card 28 is moved relative to them. When a corner portion $28_1$ of the insertion side edge of the magnetic card 28 is cut away, the re-recording inhibition switch is not driven, whereby the re-recording inhibition state is detected. The card reader 79 has, for instance, a construction as shown in FIG. 7.

In the reading of data, a signal read out by the read/write head 128 is pulse shaped by a pulse shaper 36 and then demodulated by a demodulator 138, whereby the read-out data is obtained.

In the writing of data, a signal obtained after frequency modulation by a frequency modulator 140 and subsequent amplification by a recording amplifier 142 is recorded by the read/write head 128.

The timing signals for reading data out of and writing data into a memory are detected by the timing head and supplied through the pulse shaper to the microcomputer 74 and to the amplifier 142 for recording and to the frequency modulator 140.

The display section 82 has a 7-segment construction. In case when displaying, for instance, a data "1:23" as shown in FIG. 8, the timing of the individual segment signals is as shown in FIGS. 9A through 9G. Also in this case the digit signals are as shown in FIGS. 9H through 9L. In these Figures the abscissas indicates time and the ordinates indicates the voltage level of a pulse.

Now, the operation of reading out the heating program from the keyswitch board 20 and card reader 79, memorizing it in the RAM 92 and successively displaying it will now be described with reference to FIGS. 10A through 10C.

FIG. 10A shows the operation of coupling the heating program from the keyswitch board to the RAM 92.

In the first place, the column and row counters are initialized to 0 (step 144).

Then, one character is read out from the keyswitch board 20 (step 146), and then it is determined whether or not the read-out character is that for the review key is checked (step 148).

If the read-out character is not that of the review key, whether or not the value of the column counter 101 "8" (step 150). If the contents are not "8", that is, if the column is full, that character is written in the RAM (step 158). If the value is "8", the row counter 100 is incremented by "1" (step 152), and then it is determined whether or not the value of the row counter is "3" (step 154). If the value is not "3", the column counter 100 is set to "0" (step 156), then the read-out character is written in the RAM (step 158), and then the colunn counter 100 is incremented by "1" (step 160). The operation then returns to the step 146 to repeat the aforementioned steps by reading out one character from the keyswitch board 20. If the value of the row counter 100 is "3", it means that the heating program for the first, second and third stages has already been written, so that at this time the error buzzer is operated (step 162) and the keying of any further heating program is inhibited.

If the read-out character in the step 148 is that of the review key, the operation proceeds to a step A (see FIG. 10B). In the step A, the buzzer is first operated for a predetermined period of time (step 164). This is done so for informing of the end of cooking program input.

Then, the column and row counters are initialized to "0" (step 166). Subsequently, whether or not the value of the column counter is "8" is checked (step 168). If the value is not "8", one character is read from the RAM 92 (step 176). The read-out character is then displayed on the display section 82 of the keyboard assembly 80 (step 178). Then the column counter is incremented by "1" (step 180), and the operation then returns to the step 168 to repeat the same sequence of steps.

If the value of the column counter is "8", the row counter is incremented by "1" (step 170), and then it is determined whether or not the contents of the row counter is "3" is checked (step 172).

If the value of the row counter are "3", it brings an end to the continuous display of the contents of the RAM 92. If the contents are not "3", the column counter is set to "0" (step 174), and then the operation proceeds to the step 176 for reading out one character from the RAM 92 as mentioned earlier.

FIG. 10C shows the operation in case when the heating program is loaded from the card reader 79.

In this case, the column and row counters are first set to "0" (step 182). Then, it is determined whether or not the magnetic card 28 is inserted is checked (step 184).

If the magnetic card 28 inserted is detected, the buzzer is operated for a predetermined period of time (step 186), and then one character is read out from the magnetic card 28 (step 188). Then, it is determined whether or not the value of the column counter is "8" (step 190).

If the value is not "8", the read out character is written in the RAM 92 (step 198). Then, the column counter is incremented by "1", and the operation then returns to the step 188.

If the value of the column counter is "8" in the step 190, the row counter is incremented by "1" (step 192), and then it is determined whether or not the value of the row counter is "3" (step 194). If the value is not "3", the column counter is set to "0" (step 196), and then the operation proceeds to the step 198. The above sequence of steps is repeated until the contents of the row counter checked in the step 194 are found to be "3", whereupon the reading of the heating program from the magnetic card 28 is ended, and the operation proceeds to the step A. In the step A the contents of the RAM 92 are continuously displayed in the manner as described above in connection with FIG. 10B.

Thus, in case of a heating program, in which the time period and power output level are respectively 10 minutes and 100% for the first stage, 5 minutes and 50% for the second stage and 8 minutes and 70% for the third stage, display of the display section 82 changes in a manner as shown in FIG. 11, and from this display the contents of the preset heating program can be verified. In this example, a colon is provided between the minute and second figures of the time display, and in the power display the character P (representing power) is displayed in the first place.

After verifying the heating program from the above display, the foodstuff to be cooked is put into the microwave oven, then the door thereof is closed, and the start key in the keyswitch board 20 is then turned on. As a result, the microcomputers 62 and 74 cause the relay driving circuit 66 to turn on the magnetic contactor 40 and also cause the photo-coupler driving and AC interface circuit 68 to effect the control of the output of the magnetron 48 in such a manner that the heating is effected in accordance with the contents of the preset heating program.

In case when the periods for the individual stages of the heating program are specified, the microcomputer 62 effects the control of the heating period of each stage by measuring the time from the time pulse input from the time pulse circuit 170 and comparing the measured time with the specified time data. Also, in case when the temperature of the foodstuff for each stage of the heating program is specified, the microcomputer 74 controls the foodstuff temperature for each stage through the comparison of the detected foodstuff temperature data input and the specified temperature data.

As has been shown in the foregoing, with the microwave oven according to the invention the preset heating program contents stored in the microcomputers 62 and 74 can be automatically and successively read out for each data at a constant time interval by merely operating a predetermined switch such as the review switch. Also, it is possible to read out heating program data recorded on the magnetic card 28 to the card reader 79 and subsequently automatically and successively read out and display the individual memorized heating program data. Thus, unlike the prior art it is not necessary to operate a plurality of keys for reading out and displaying data for each stage of the heating program for the purpose of the checking thereof, and thus the operation of checking the program can be extremely simplified.

What is claimed is:

1. A programmable microwave oven including means for reviewing previously programmed cooking instructions, comprising:

a keyboard data input means having function keys for inputting data representing cooking instructions defining a sequence of heating power levels and a cooking time or a cooking temperature associated with each such power level;

a means for exciting a heating element at selectable power levels;

a display means for displaying data previously inputted via said keyboard data input means; and a control means, including a microprocessor, coupled to said keyboard data input means, exciting means, and display means, including read only memory (ROM) means for storing a fixed program, a random access memory (RAM) means for memorizing data inputted via said keyboard data input means, and a central logic unit for (a) carrying out the fixed program of said ROM means in accordance with the data inputted via said keyboard data input means and (b) generating signals for controlling said exciting means in accordance therewith so as to obtain a combination of power levels and times or temperatures associated therewith according to the cooking instructions previously inputted via said keyboard data input means, said keyboard data input means, said RAM means and said display means being controlled according to said fixed program of said ROM such that in response to a single actuation of said reviewing means after data has been entered via said keyboard data input means and stored in said RAM means, the so stored data in said RAM means are successively read out and displayed before the cooking is carried out in accordance with data indicative of the cooking instructions, the display changing automatically at predetermined intervals of time between successive displays to display successive data, the control means inhibiting the execution of the cooking instruction unless they have been reviewed by operation of the reviewing means.

2. A programmable microwave oven including means for reviewing previously programmed cooking instructions, comprising:

a card data input means for reading data representing a cooking instructions defining a sequence of heating power levels and a cooking time or cooking temperature associated with each such power level from a card having a record section bearing recorded data indicative thereof;

a means for exciting a heating element at selectable power levels;

a display means for displaying including data previously inputted via said card data input means; and a control means, including a microprocessor, coupled to said card data input means, exciting means and display means, including a read only memory (ROM) means for storing a fixed program, a random access memory (RAM) means for memorizing data inputted via said card data input means, and a central logic unit for (a) carrying out the fixed program of said ROM in accordance with the data inputted via said card data input means and (b) generating signals for controlling said exciting means in accordance therewith so as to obtain a combination of power levels and times or temperatures associated therewith according to the cooking instructions previously inputted via said card data input means;

said card data input means, RAM means and said display means being also controlled according to said fixed program of said ROM such that after data has been entered via said card data input means and stored in said RAM means the data stored in said RAM means are successively read out and displayed before the cooking is carried out in accordance with the data indicative of the cooking instructions, the display changing automatically at a predetermined interval of time between successive displays to display successive data;

the control means inhibiting the execution of the cooking instructions unless they have been reviewed by actuation of the reviewing means.

3. A microwave oven according to claim 2, further including a keyboard data input device having numeric keys and function keys including a review key adapted to generate, upon actuation of said review key, a coded electric signal corresponding to said review key, and wherein said keyboard data input device, said RAM and display means are controlled by said fixed program such that when said review key is depressed the contents of said random access memory are sequentially read out to permit it to be continuously displayed with a predetermined time interval.

* * * * *